(12) United States Patent
Von Bulow et al.

(10) Patent No.: US 10,115,412 B2
(45) Date of Patent: Oct. 30, 2018

(54) SIGNAL PROCESSOR WITH SIDE-TONE NOISE REDUCTION FOR A HEADSET

(71) Applicant: GN Audio A/S, Ballerup (DK)

(72) Inventors: Allan Mejlgren Von Bulow, Ballerup (DK); Christoffer Bovbjerg, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 15/674,334

(22) Filed: Aug. 10, 2017

(65) Prior Publication Data

US 2018/0047410 A1 Feb. 15, 2018

(30) Foreign Application Priority Data

Aug. 11, 2016 (EP) ...................................... 16183759

(51) Int. Cl.
| | |
|---|---|
| H04R 1/10 | (2006.01) |
| G10L 21/0232 | (2013.01) |
| G10L 25/84 | (2013.01) |
| H04R 3/04 | (2006.01) |
| H04M 1/58 | (2006.01) |
| H04M 1/60 | (2006.01) |
| G10L 21/0208 | (2013.01) |

(52) U.S. Cl.
CPC .......... *G10L 21/0232* (2013.01); *G10L 25/84* (2013.01); *H04M 1/585* (2013.01); *H04R 1/1041* (2013.01); *H04R 1/1083* (2013.01); *H04R 3/04* (2013.01); *G10L 21/0208* (2013.01); *H04M 1/6058* (2013.01); *H04R 2430/03* (2013.01)

(58) Field of Classification Search
CPC ... G10L 21/0232; G10L 25/84; H04R 1/1041; H04R 1/1083; H04R 3/04
See application file for complete search history.

(56) References Cited

U.S. PATENT DOCUMENTS

| | | | |
|---|---|---|---|
| 4,000,369 A | 12/1976 | Paul, Jr. et al. | |
| 6,711,259 B1 * | 3/2004 | Haimi-Cohen ....... | H04M 1/585 379/390.03 |

(Continued)

OTHER PUBLICATIONS

Miyazaki et al. "Musical-Noise-Free Speech Enhancement Based on Optimized Iterative Spectral Subtraction"; IEEE Transactions on Audio Speech, and Language Processing, vol. 20, No. 7, Sep. 2012.*

(Continued)

*Primary Examiner* — Andrew L Sniezek
(74) *Attorney, Agent, or Firm* — Altera Law Group, LLC

(57) ABSTRACT

A signal processor (105) for a headset (101) configured with a microphone terminal (106) for receiving a microphone signal, a loudspeaker terminal (107) for outputting a loudspeaker signal, and a far-end terminal (108) for communicating an inbound signal and an outbound signal with a far-end; comprising: a side-tone path (110) configured to generate a side-tone signal from the microphone signal via a controllable side-tone filter; wherein a side-tone filter controller (114) receives the microphone signal and computes a first noise estimate with a signal-to-noise level of the microphone signal at respective frequency bands and based thereon controls the side-tone filter (111) to improve or optimize a signal-to-noise ratio.

19 Claims, 9 Drawing Sheets

(56) References Cited

U.S. PATENT DOCUMENTS

| | | | |
|---|---|---|---|
| 7,330,739 B2 | 2/2008 | Somayajula | |
| 7,881,927 B1* | 2/2011 | Reuss | G10L 25/78 |
| | | | 704/226 |
| 9,053,697 B2 | 6/2015 | Park et al. | |
| 2003/0063736 A1* | 4/2003 | King | H04M 9/08 |
| | | | 379/406.01 |
| 2005/0177365 A1* | 8/2005 | Ikeda | H04M 1/58 |
| | | | 704/226 |
| 2008/0201138 A1 | 8/2008 | Visser et al. | |
| 2010/0020940 A1* | 1/2010 | Zad-Issa | H04M 1/24 |
| | | | 379/32.01 |

OTHER PUBLICATIONS

Extended European Search Report for European patent app No. 16183759.6 dated Feb. 13, 2017.

Miyazaki R. et al.: "Musical-Noise-Free Speech Enhancement Based on Optimized Iterative Spectral Subtraction", IEEE Transactions on Audio, Speech and Language Processing, IEEE, vol. 20, No. 7, Sep. 1, 2012, pp. 2080-2094, XP011470757, ISSN: 1558-7916.

Saeed V. Vaseghi: "Speech Enhancement", in "Multimedia Signal Processing", Oct. 22, 2007, John Wiley & Sons, Ltd., XP055341762, ISBN: 978-0-470-06650-8, pp. 527-590.

"Adding Sidetone to Skype" (available at https://channel9.msdn.com/coding4fun/articles/Adding-Sidetone-to-Skype), Jun. 9, 2009.

* cited by examiner

SIGNAL PROCESSOR WITH SIDE-TONE NOISE REDUCTION FOR A HEADSET

INTRODUCTION/BACKGROUND

A headset for voice communications (e.g., a Bluetooth™ headset, a DECT headset or a wired headset, such as a USB headset) typically contains a loudspeaker for reproducing a far-end audio signal at one of the user's ears and a voice microphone for receiving the headset wearer's speech.

The loudspeaker is positioned at one or both of the headset wearer's ears, and the voice microphone is arranged within the headset to be positioned during use to receive the user's speech with an acceptably high signal-to-noise ratio. The voice microphone is typically located, for example, within a headset housing, an ear-cup, in a headset boom or other protrusion that extends from such a housing toward the user's mouth, or on a cord that carries audio signals to and from the cellular telephone.

A headset may attenuate sound from the environment around the headset wearer by an ear-cup or an active noise-cancelling technique such that the headset wearer is protected from disturbing sounds around him/her. A headset may also attenuate sound from the environment around the headset wearer before transmission to a far end e.g. in case the voice microphone is a directional microphone e.g. implemented using beamforming.

It may happen that a headset attenuates not only sound from the environment but also the headset wearer's own speech. This causes problems for the headset wearer to adapt his speech and in particular how loud he/she talks since he/she cannot hear him-/herself.

To overcome that problem, the headset may be configured with a feedback path whereby a small amount of the headset wearer's own speech (picked up by the voice microphone) is fed back to the headset wearer's ear via the loudspeaker. This is also known as a side-tone. The side-tone is often attenuated or amplified to reflect the amount of feedback a person will perceive when speaking in a room without wearing a headset.

The further away from the headset wearer's mouth the voice microphone is situated, the more sound from the surroundings relative to speech from the headset wearer will be picked up and reproduced by the loudspeaker in his/hers ears. This may be a problem since it is often preferred to dispense with microphone booms or similar extensions.

It should be noted that conventionally sometimes a loudspeaker in a headset is denoted a receiver.

RELATED PRIOR ART

U.S. Pat. No. 7,330,739 describes a wireless communication device that provides a side-tone to the device user. The device converts an outbound analogue audio signal from a microphone to an outbound audio bit-stream from which a side-tone bit-stream is extracted. The side-tone bit-stream is extracted between a sigma-delta ADC and before a FIFO buffer. The device also converts an inbound digital audio signal, such as a 13 bits signal, to an inbound audio bit-stream, such as a 1 bit signal, by means of a sigma-delta converter. The side-tone bit-stream is added to the inbound audio bit-stream after a FIFO buffer and before a low-pass filter, such as a bi-quadratic switch capacitor filter, which converts the audio bit-stream from the sigma-delta converter to an analogue signal. It is claimed that problems in connection with digital implementations related to latency of the side-tone are overcome. It is also claimed that since both the inbound audio bit-stream and the side-tone bit-stream are filtered by the same bi-quadratic switch capacitor filter the 'richness' of the two audio signals is substantially the same and therefore they sound equally 'rich' or 'loud'.

U.S. Pat. No. 9,053,697 describes a headset with an active noise cancellation (ANC) system. The ANC system is coupled to a noise reference microphone that, contrary to a voice microphone, is directed at an ear canal of the headset wearer during use of the headset to pick up an external noise reference signal, generate an anti-noise waveform from the noise reference signal, and reproduce the anti-noise waveform through one or more loudspeakers in the headset. The use of an ANC technique may reduce the level of background noise that reaches the headset wearers ear (by up to twenty decibels) while delivering useful sound signals, such as music and far-end voices received from a far end.

It is described that a mixer may be configured to mix some audible amount of the headset wearer's speech (a near-end speech estimate) into an audio signal to be reproduced by the one or more loudspeakers in the headset; this is also known as a side-tone. The near-end speech estimate may be any among: a near-end signal (which is based on information from a voice microphone), a noise-suppressed signal from a noise suppression filter and other signals. In one example, the noise suppression filter is configured to distinguish speech frames of its input signal from noise frames of its input signal and to produce noise-suppressed signal to include only the speech frames. The noise suppression filter is alternatively implemented as spatially selective processing filter.

The Internet article "Adding Sidetone to Skype" (available at https://channel9.msdn.com/coding4fun/articles/Adding-Sidetone-to-Skype) describes a software plug-in for Skype™ that adds a side-tone to the earpiece of a headset. In one example, the side-tone is added via a digital low-pass filter of the Butterworth type implemented as an IIR filter.

However, it remains a problem that noise from the surroundings may be picked up by the voice microphone and end up in the headset wearer's ear via the side-tone and not least in the far-end.

SUMMARY

There is provided a signal processor for a headset configured with a microphone terminal for receiving a microphone signal, a loudspeaker terminal for outputting a loudspeaker signal, and a far-end terminal (108) for communicating an inbound signal and an outbound signal with a far-end; comprising:
- an outbound path from the microphone terminal to the far-end terminal;
- a side-tone path configured to generate a side-tone signal from the microphone signal via a side-tone filter;
- an inbound path from the far-end terminal to the loudspeaker terminal and comprising a combiner configured to combine the side-tone signal and the inbound signal to generate the loudspeaker signal; and
- a side-tone filter controller that receives the microphone signal and computes a first noise estimate with a signal-to-noise level of the microphone signal at respective frequency bands and based thereon controls the side-tone filter to improve a signal-to-noise ratio of the side-tone signal; wherein the side-tone filter is a controllable side-tone filter.

Thereby a side-tone signal may be generated wherein noise picked up by a voice microphone of the headset, while the headset wearer speaks, may be attenuated. Since the side-tone filter is controlled based on the first noise estimate with a signal-to-noise level of the microphone signal at respective frequency bands the side-tone filter may attenuate frequency bands with a poor signal-to-noise ratio relatively to frequency bands with a better signal-to-noise ratio. The amount of attenuation may be determined based on the signal-to-noise ratio at respective frequency bands. This greatly improves the acoustic impression experienced by the headset wearer since a side-tone with significantly less noise is induced into the headset wearer's ears. The noise estimate may be used to describe at which frequencies the noise predominantly occurs and at what level the noise occurs.

The side-tone filter may be controlled to improve a signal-to-noise ratio of the side-tone signal by attenuating the microphone signal in a frequency band wherein the first noise estimate is indicative of a relatively low signal-to-noise ratio relative to a frequency band wherein the first noise estimate is indicative of a relatively high signal-to-noise ratio.

The signal-to-noise level of the side-tone signal may be evaluated over multiple frequency bands, such as over all or selected ones of the respective frequency bands or over an audio band, such as over an audio band of interest.

The side-tone filter may be an Infinite Impulse Response, IIR, filter such as a digital IIR filter with discrete filter coefficients. IIR filters have a lower latency than FIR filters and are advantageous since they introduce a lower latency. Latency in generation of the side-tone may be very disturbing for the headset wearer; especially latency longer than about 5 milliseconds is considered to be disturbing.

The side-tone filter implements a transfer function with poles and/or zeroes that are controllably arranged to exhibit a desired gain and/or phase characteristic over an audio band of interest. The desired gain characteristic may comprise one or more of a low-pass band, a high-pass band, a stop-band, a pass-band, a "low shelf", and a "high shelf". A "low shelf" has a gain above or below 0 dB below a cut-off frequency and a gain of 0 dB above. In contrast, a "high shelf" has a gain of 0 dB below the cut-off frequency and a gain above or below 0 dB above the cut-off frequency. In some aspects a "low shelf" attenuates signals below the cut-off frequency and a "high shelf" attenuates signals above the cut-off frequency. A pass band or stop band may be implemented by a peak-filter.

The audio band of interest may be from 20 Hz to 20 KHz or a wider or narrower audio band. In general a cut-off frequency is a frequency at which the gain has fallen to a −3 dB level relative to a nearest 0 dB level at a higher or lower frequency.

In some aspects the signal-to-noise estimator sits in a control path, extending from the microphone terminal to the side-tone filter, with a controller that controls the controllable side-tone filter. Thus, the control path receives the microphone signal.

The microphone signal is filtered by the controllable side-tone filter at a filter rate, typically, at a regular sample rate or a decimated sample rate. The control path controls the controllable side-tone filter at a control rate, which may be the same as the filter rate or a lower regular or irregular rate. The controllable side-tone filter is adapted at the control rate.

The signal-to-noise estimator may estimate the signal-to-noise level of the microphone signal at respective frequency bands related to "frequency bins". The term "frequency bin" often relates to a digital (discrete) implementation of the signal-to-noise estimator wherein a discrete range of frequencies and discrete resolution of an estimated spectrum depends on sampling rate and the number of sampling points. The spectrum is computed for a number of points—often denoted "bins" or "frequency bins". However, it should be emphasized that an analogue implementation is foreseeable too.

In some embodiments the side-tone filter, in the side-tone path, comprises multiple filter stages that are individually controlled based on the first noise estimate.

Thereby it is possible to realize a low latency and flexible filter structure that can be controlled in terms of frequency and gain to attenuate noise in selected frequency bands. Each of the individually controllable filter stages may be an IIR filter e.g. of the bi-quad type.

The multiple filter stages may implement similar or different filter structures and similar or different filters located at overlapping or non-overlapping frequency bands. A filter may be considered to not overlap another filter in case one of the filters alters the gain by less than a threshold gain such as less than 3 dB or less than 1 dB as examples.

Each of the individually controllable filter stages may be controlled by setting filter coefficients in a predetermined filter structure e.g. a bi-quad direct form or bi-quad direct form 2, or a bi-quad transposed form. The filter stages may be controlled via parameters such as a centre frequency, bandwidth and gain for a peak filter, via a cut-off frequency, steepness and a gain level for a shelf filter, and via a cut-off frequency and steepness for a low-pass filter; however other parameters may be used additionally or alternatively.

In some embodiments the multiple filter stages are configured from a group consisting of: multiple peak filters and a high-shelf filter.

Thereby the multiple peak filters may be arranged to specifically attenuate signals in accordance with the signal-to-noise ratio at frequencies where there is a poor signal-to-noise ratio.

The peak filters may be configured in terms of a centre frequency, a gain and a bandwidth. The gain of the peak filter may be controlled at gains below 0 dB. The high-shelf filter may be configured in terms of a shelf midpoint frequency. The gain of the high-shelf filter at the shelf may be controlled at gains below 0 dB.

In some aspects the group consists of less than six peak filters, e.g. between three and six peak filters, and one or two high-shelf filters. Thereby a good trade-off between low complexity, low latency and signal-to-noise ratio improvement is achieved. In some aspect a series of five peak filters and one high-shelf filter, all of the bi-quadratic type, has been found by experiments to give a good trade-off.

In some aspects the filter stages are arranged in series, wherein a high-shelf filter is the last filter in the series. Thereby the high-shelf filter, which follows the peak filters, may soften undesired effects of filtering the microphone signal by multiple peak filters. The high-shelf filter may be controlled to have an appropriate shelf mid-point frequency and attenuation at the shelf to achieve this purpose. An advantage of a high-shelf filter, that attenuates higher frequencies, is that it is possible to attenuate noise while only degrading intelligibility of speech marginally.

In some embodiments the side-tone filter controller executes an iterative process of:
   determining parameters for a filter stage based on the first noise estimate;
   computing a frequency domain gain estimate of the frequency domain gain transfer function for a filter stage;

computing a second noise estimate by subtracting the frequency domain gain estimate from the first noise estimate;

updating the first noise estimate to be in accordance with the second noise estimate;

wherein the filter stages are controlled via coefficients computed from the parameters for a respective filter stage computed over iterations of the iterative process.

An advantage of the iterative estimation process, when the filter stages are of the IIR type, is that the side-tone filter configured thereby has very low latency while still providing a good suppression of noise in the side tone signal.

It has been realized that the computational effort in computing the effect on the noise estimate of applying the selected filter, which would be to filter a portion of the microphone signal with the selected filter, may be too big for the signal processor. However, by iteratively computing an estimate of the effect of applying the selected filter, the computational effort may be much reduced.

By such iterative determining of parameters for filter stages in the side-tone filter, based on a noise estimate which is updated from one iteration to another, wherein a frequency domain gain transfer function for a filter stage is estimated—instead of being completely computed—the side-tone filter can be more frequently and more smoothly updated to keep up with the optimization of signal-to-noise ratios at respective frequency bands.

The iterative process starts out, in its first iteration, from the first noise estimate computed from the microphone signal; whereas in a second and further iteration, the first noise estimate is based on estimating the effect of filtering the microphone signal by a filter for which parameters are determined in a succeeding iteration.

The frequency domain gain estimate may be supplemented by a frequency domain phase estimate. An advantage of computing a frequency domain estimate for a filter stage—instead of applying the filter—is that the updated noise estimate (the second noise estimate) can be computed bin-by-bin without time-consuming convolution computations.

The frequency domain gain estimate may be approximated by a geometric approximation such as a corner frequency approximation.

In some aspects coefficients for a filter stage are implemented in a filter stage during the course of the iterative process. In other aspects, the filter stages are controlled via the coefficients when the iterative process has completed an iteration round. In the latter case, the signal processor keeps a representation, over the course of the iterative process, of each filter model computed at respective iterations of the process.

In some embodiments determining parameters for a filter stage comprises fitting a filter that has a largest possible gain-bandwidth product while optimizing the signal-to-noise ratio in an audio band of interest.

Thereby it is ensured that the filter stages that are available are utilized most effectively in terms of improving the signal-to-noise ratio as far as possible given the available filter stages. This in turn improves the acoustic quality perceived by the headset wearer.

The fitting of such a filter, with a largest possible gain-bandwidth product, may be performed using a numerical optimization process.

It should be noted that "a filter" in connection with "fitting a filter" is a representation of a filter either by parameters for a type of filter such as centre frequency and gain for a peak filter of the bi-quad type or by coefficients for an implementation form or structure.

In some embodiments fitting a filter comprises:

over a range of frequencies, iteratively selecting a frequency; and determining a gain-bandwidth product of a band centred at the frequency and determining a gain factor thereof based on the signal-to-noise ratio and determining a bandwidth factor thereof as the bandwidth wherein the signal-to-noise ratio is not better than approximately half the signal-to-noise ratio at the frequency;

when the range of frequencies has been iterated, selecting a favourable gain-bandwidth product, such as the largest gain-bandwidth product, and estimating parameters for a band-attenuate filter, such as a peak-filter, with a centre frequency and a gain to approximately fit the determined band.

Thereby the signal processor can perform a fast and robust filter fitting process. The filter fitting process has shown to be robust despite of the fitting process being based on a much simplified representation of a filter in its selection of a "best fitting" filter.

In some embodiments fitting a filter comprises:

fitting a high-shelf filter by selecting a predetermined shelf mid-point frequency and determining a shelf gain, such as an attenuation, from an average of the signal-to-noise ratio at frequencies above the shelf mid-point frequency.

Such a high-shelf filter has shown to significantly reduce distortion or soften audible artefacts introduced by regularly or irregularly changing the characteristics of the filter stages in the side-tone filter. The quality of the acoustics obtained by introducing a side-tone is thereby improved.

The high-shelf filter further enables suppression of high-frequency noise in a single filter with an effect comparable to that of multiple peak or band filters, without significant degradation of speech quality, and with significantly less latency than that achievable with such multiple filters.

In some embodiments the signal processor:

at a first time, computes a reference gain based on a minimum attenuation in the noise estimate and scales the microphone signal based on the reference gain; and at a second time, following the first time, performs the iterative process set out above.

Thereby the efficacy of the noise reduction is enhanced at least in cases wherein very little speech is detected. The reference gain may be applied uniformly across frequency bins.

The reference gain may be computed from the noise estimate by searching for a minimum attenuation, this value is applied as a reference gain to the full bandwidth. Applying the reference gain to compensate the noise estimate improves the filter fitting process e.g. when very little speech is detected.

In some embodiments the signal processor:

at a second time, computes a frequency domain gain estimate of a high-shelf filter, and then computes a second noise estimate by subtracting the frequency domain gain estimate from the first noise estimate;

at a third time, following the second time, performs the iterative process set out above, wherein the filter is a stop-band filter or a peak-filter.

In some aspects, during configuration of the filter stages, the second time follows the first time; thus, firstly a uniform gain is estimated and applied for the following estimation purposes, secondly the high-shelf filter is estimated and thirdly the stop-band filter or peak-filter is estimated.

It should be noted that some aspects processing of the microphone signal (in real time) comprises firstly scaling the microphone signal by the estimated uniform gain, secondly filtering the scaled microphone signal by filter stages comprising the estimated band-attenuate of peak filters and thirdly applying a last filter stage configured as a high-shelf filter.

In some aspects, the order of computing parameters and/or coefficients for the filter stages, e.g. the peak and/or band filters, is the same as the filter stages' order in the series of filter stages in the controllable side-tone filter.

In some aspects, computing parameters and/or coefficients for peak-filter or band filter stages follows computing of one or both of overall gain and parameters and/or coefficients for the high-shelf filter. Thus, gain and parameters and/or coefficients for the high-shelf filter are computed first and then coefficients for peak-filter or band filter stages are computed. It should be noted that the order in which parameters are computed for the filter stages and gain stages plays a role since the noise estimate is updated in between and is used for a subsequent computation.

In some embodiments a cost function is defined for an optimization process; wherein the cost function is a frequency domain estimate of the signal-to-noise ratio which in a first iteration is computed from the microphone signal and in subsequent iterations is computed from the cost function and estimates in the frequency domain of selected filters; and wherein the optimization process iteratively selects a filter with an optimization strategy to optimize the cost function and then updates the cost function.

In some embodiments determining parameters for a filter stage by fitting a filter comprises dampening the rate and/or distance the centre frequency and/or bandwidth is allowed to change over time.

Thereby undesired effects, such as introduction of distortion or acoustic artefacts, caused by regularly or irregularly changing the filter characteristics may be reduced and made less audible or more pleasant to the human ear. The high-shelf filter may be controlled to have an appropriate shelf mid-point frequency and attenuation at the shelf to enhance suppression of such undesired effects.

The rate and/or distance the centre frequency and/or bandwidth is allowed to change over time may be controlled by a low-pass filter type comprising a low-shelf filter or a controller.

Several restrictions may be applied to suppress audible artefacts resulting from rapid and/or large shifts in bi-quad filter coefficients:

The filter fitting process may be restricted to, for a selected filter, search within a respective predefined frequency range to limit the filter's shift in centre or cut-off frequency from one iteration to the next. This ensures that peak filter stays within the respective predefined frequency range.

The filter fitting process may be further restricted such that a filter does not deviate more than a certain percentage or amount from the filter computed in a previous iteration. So, the filter fitting process may be allowed to search only in a frequency range about the filter's previous centre or cut-off frequency and within the respective predefined frequency range.

In some embodiments the signal processor comprises a voice activity detector which indicates presence of speech; wherein a first amplitude or power spectrum for the microphone signal is computed at a time when the voice activity detector is detecting speech; wherein a second amplitude or power spectrum for the microphone signal is computed at a time when the voice activity detector is not detecting speech; and wherein the signal-to-noise ratio is computed from the first amplitude or power spectrum and the second amplitude or power spectrum.

There is also provided a signal processing method for generating a side-tone in a headset, comprising:
generating a side-tone signal via a side-tone filter and from a microphone signal picked up via a microphone of the headset,
combining the side-tone signal and an inbound signal to the headset to generate a loudspeaker signal for a loudspeaker of the headset; and
computing a first noise estimate of the microphone signal at respective frequency bands and based thereon controlling the side-tone filter to improve a signal-to-noise ratio of the side-tone signal;
wherein the side-tone filter is a controllable side-tone filter.

Additional, optional, aspects or steps of the signal processing method are set out in connection with the above signal processor.

There is also provided a computer-readable medium carrying a program configured to perform the signal processing method, wherein the signal processing method is a computer-implemented method run on a computer. There is also provided a headset comprising a voice microphone, an earpiece with a loudspeaker and a signal processor according to any of the preceding claims.

The headset may be of the type having a microphone boom ( ) hosting the microphone, or of the type wherein the microphone is hosted in an interposed housing on a wire connection of the headset or of the type wherein the voice microphone is hosted with the loudspeaker in a common housing, such as an earpiece, earbud or ear cup.

Here and in the following, the terms 'signal processor', 'filter', 'controllable filter', 'side-tone filter', 'controllable side-tone filter' 'controller' etc. are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

BRIEF DESCRIPTION OF THE FIGURES

A more detailed description follows below with reference to the drawing, in which.

DETAILED DESCRIPTION

Figure 1:
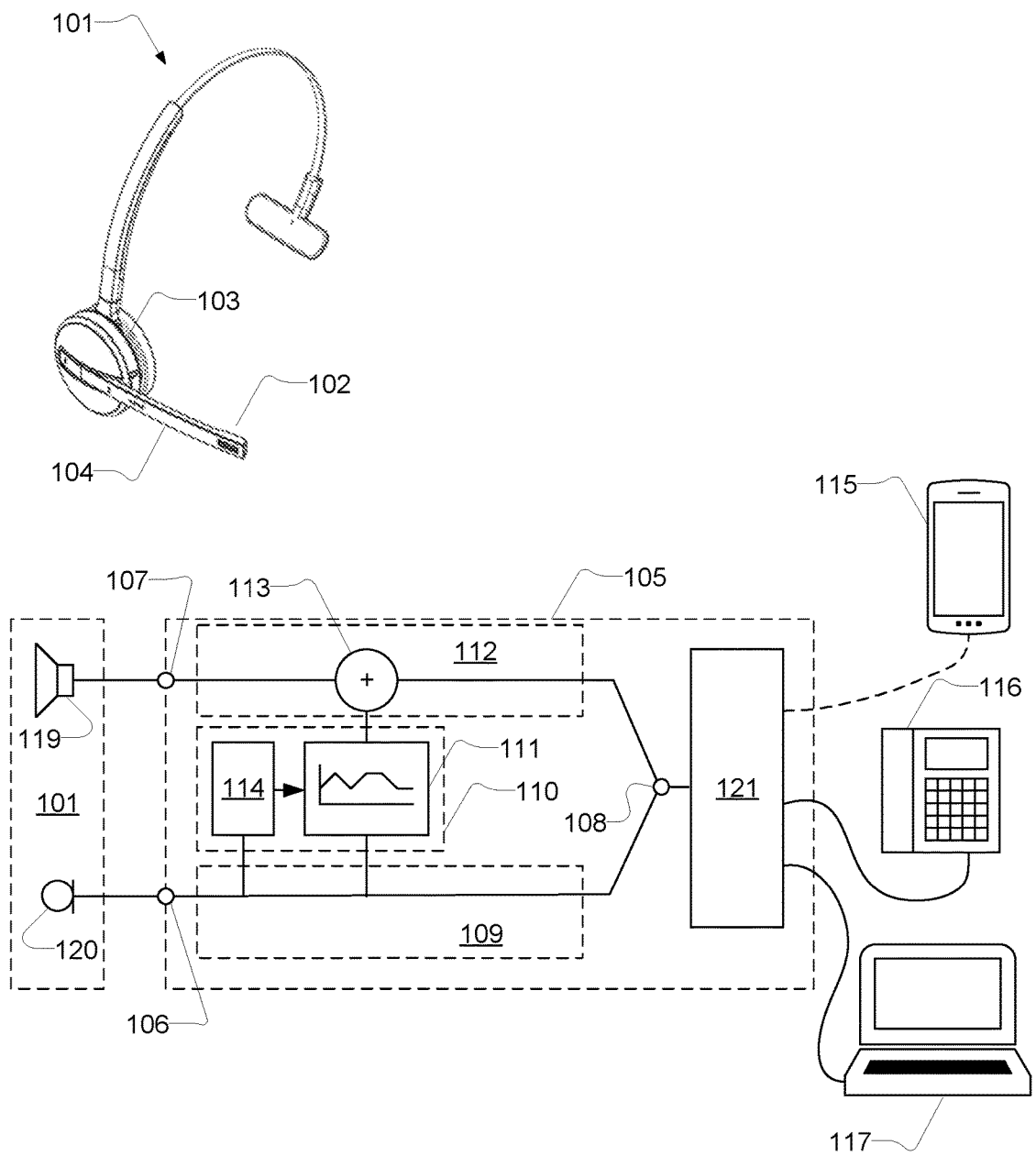
FIG. 1 shows a block diagram of a headset with a signal processor.

FIG. 1 shows a block diagram of a headset with a signal processor. The headset 101 is depicted in a 3D representation and in a diagrammatic representation.

As shown in the 3D representation, the headset 101 may have a housing 103 with an ear-cup, of the on-the-ear type or over-the-ear type and a microphone boom 104 extending from the housing 103 and having a microphone end or microphone compartment 102 hosting one or more microphones, e.g. a directional microphone, for picking up a headset wearer's speech. A headband or head support is provided for holding the headset on the headset wearer's head. In some embodiments, the headset may have an additional ear-cup for the other ear. In some embodiments the ear-cups are of the earbud type and the microphone boom 104 is replaced by an in-line microphone which is attached to a cord. The cord may connect to the headset to a computer 117, a desk telephone 116, or a smartphone 115—in some embodiments via a base-station for the headset (not shown). In some embodiments the headset is a wireless headset communicating wirelessly with one or more of the computer 117, the desk telephone 116, the smartphone 115 or the base station.

As shown in the diagrammatic representation, the headset 101 (represented by a dashed-line box) comprises a loudspeaker 119 and a microphone 120. Further circuitry such as a preamplifier and an analogue-to-digital converter for the microphone and such as an amplifier for driving the loudspeaker is not shown.

The headset 101 has a signal processor 105, which may be accommodated in the housing 103. The signal processor 105 is configured with a microphone terminal 106 for receiving a microphone signal from the microphone 120, a loudspeaker terminal 107 for outputting a loudspeaker signal to the loudspeaker 119, and a far-end terminal 108 for communicating an inbound signal and an outbound signal with a far-end. The inbound signal and the outbound signal may be communicated on a common terminal as a bi-directional digital signal or on respective inbound and outbound terminals.

Here and in the following, a far-end refers to a communications device, audio receiver or system to which the headset wearer's speech, as reproduced by the microphone 120 and an outbound path of the headset, is transmitted as an outbound signal and/or a communications device, audio source or system from which an audio signal is received as an inbound signal and reproduced in the loudspeaker towards the headset wearer's ear. An inbound signal and an outbound signal refer to any type of audio signal received from and transmitted to the far end, respectively.

An outbound path 109 extends from the microphone terminal 106 to the far-end terminal 108. The outbound path 109 may comprise circuitry, such as an analogue-to-digital converter, a filter, and/or a buffer, for processing and/or communicating the microphone signal to the far-end terminal.

An inbound path 112 extends from the far-end terminal 108 to the loudspeaker terminal 107 and comprises a combiner 113 configured to combine a side-tone signal and the inbound signal to generate the loudspeaker signal. The combiner may be configured as a digital adder or an analogue adder as the case may be. In this audio context the combiner is sometimes denoted a mixer or an audio mixer. The inbound path 112 may comprises signal processing components or circuitry for one or more of noise suppression, automatic level (gain) adjustment, and transient protection.

A side-tone path 110 extends from the microphone terminal 106 or from the outbound path 109 and is configured to generate a side-tone signal from the microphone signal via a controllable side-tone filter 111. The controllable side-tone filter 111 is dynamically controlled to minimize or reduce the amount of noise picked up by the microphone 120 and reproduced in the side-tone. The controllable side-tone filter 111 is controlled by a side-tone filter controller 114 that receives the microphone signal and computes a first noise estimate. The first noise estimate is computed based on the microphone signal and comprises a signal-to-noise level at respective frequency bands. Based thereon the side-tone filter controller 114 controls the side-tone filter 111 to optimize or improve a signal-to-noise ratio at the respective frequency bands.

In this respect, noise may be represented by the microphone signal at times when speech (the headset wearer's voice) is not detected. For this purpose, a so-called voice activity detector, VAD, may indicate when speech is present and when speech is not present. In some aspects indication of when speech is present and when speech is not present is generated per frequency bin or frequency band.

One example of a voice activity detection operation includes comparing high-band and low-band energies of the signal to respective thresholds as described, for example, in section 4.7 (pp. 4-49 to 4-57) of the 3GPP2 document C.S0014-C, v1.0, entitled "Enhanced Variable Rate Codec, Speech Service Options 3, 68, and 70 for Wideband Spread Spectrum Digital Systems," January 2007 (available online at www.3gpp.org).

The controllable side-tone filter 111 may improve the signal-to-noise ratio when the noise estimate is indicative of noise that is different from e.g. white noise. However, since both noise and speech typically have a band-limited character, e.g. at multiple bands, controlling the controllable side-tone filter to attenuate microphone signals at such one or more bands may improve the signal-to-noise ratio considerably. This will be explained in more detail in the below.

It should also be noted that the signal processor 105 may comprise a communications module 121 which is connected to the far-end terminal 108 and configured to communicate the inbound and outbound signal with one or more of a smart-phone 115, a desk telephone 116, a personal computer 117, a base station (not shown) and other types of devices. The communications module 121 may be configured to communicate via wired or wireless connections e.g. via one or more of USB, DECT, and Bluetooth™.

Figure 2:
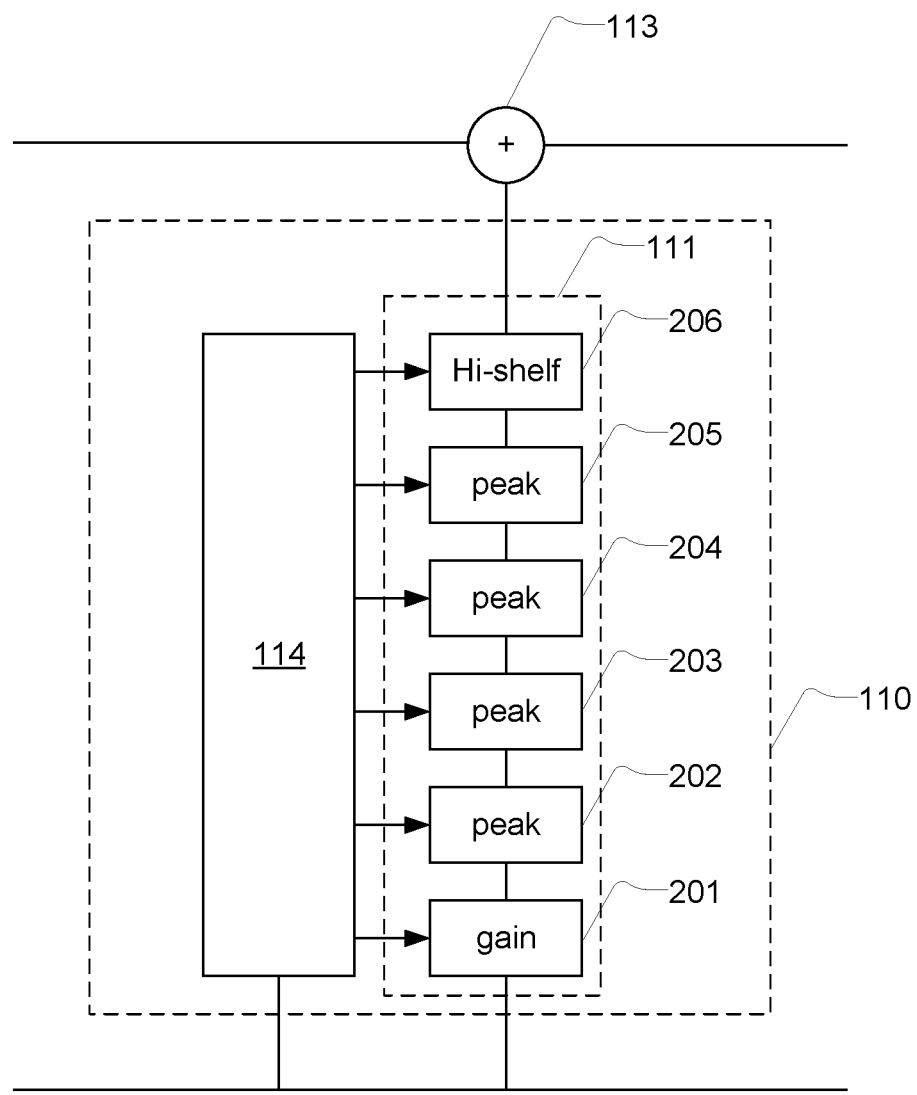
FIG. 2 shows a side-tone path with a controllable side-tone filter comprising multiple filter stages.

FIG. 2 shows a side-tone path with a controllable side-tone filter comprising multiple filter stages. In an embodiment, the controllable side-tone filter 111 comprises a series of signal processing stages comprising a gain stage 201 and multiple filter stages 202 through 206 which are individually controllable via the side-tone filter controller 114.

The series of the gain stage 201 and the multiple filter stages 202 through 206 comprises a first peak filter 202, a second peak filter 203, a third peak filter 204 and a fourth peak filter 205 followed by a high-shelf filter 206. The gain stage 201 is the first signal processing stage, followed by the peak filters 202 through 205, followed by the high-shelf filter 206.

The signal processing stages (201 through 206) are configured for low latency to avoid that the headset wearer hears his own voice with a delay. The filter stages 202 through 206 may be implemented as IIR filters e.g. as bi-quad filters. The bi-quad filters may be implemented in various ways e.g. as a transposed direct form 1 or a transposed direct form 2.

The signal processing stages comprising the filter stages and the gain stage are controlled via the side-tone filter controller 114 which sets filter coefficients and/or gain coefficients to obtain a desired transfer function for the controllable side-tone filter 111.

It should be noted that the signal processing performed by the signal processing stages of the side-tone filter is performed in the order described above, however, the signal processing stages may be configured by the side-tone filter controller 114 in an order different therefrom—for instance a coefficient of the gain stage 201 may be set firstly, then the coefficients of the high-shelf filter 206 and finally the coefficient of the peak-filter stages 202 through 205.

Other types of low-latency filter stages and combinations thereof are foreseeable.

The side-tone filter controller will be described in greater detail below with reference to approximated frequency gain responses and noise estimates and with reference to a more detailed block diagram and flowchart.

FIGS. 3 through 7 illustrates the operation of the side-tone filter controller 114 during configuration of side-tone filter stages. The figures comprises each two diagrams whereof an uppermost diagram shows a noise estimate for the microphone signal (when not yet filtered or when filtered by one or more filter stages) and an estimated or approximated frequency domain gain characteristic for a filter stage and a lowermost diagram shows an updated noise estimate for the microphone signal when filtered by the one or more filter stages.

The diagrams are Cartesian coordinate systems with their abscissa axis representing discrete frequencies or narrow frequency bands (sometimes denoted bins) which may correspond to the number of points (or a fraction thereof) used in a time-domain to frequency-domain transformation such as the FFT; and their ordinate axis representing gain, amplitude or power represented on a logarithmic scale (in decibels, dB). The ordinate axis extends from −20 dB (lowermost) to 0 dB (uppermost). Thus, a higher noise level (poorer signal-to-noise ratio) is represented by a curve or portion of the curve being located at a lower position in the diagram.

The side-tone filter controller 114 configures the filter stages one-by-one as illustrated in connection with the flowchart described below and in an order which may or may not deviate from the order in which the filter stages are arranged.

Figure 3:
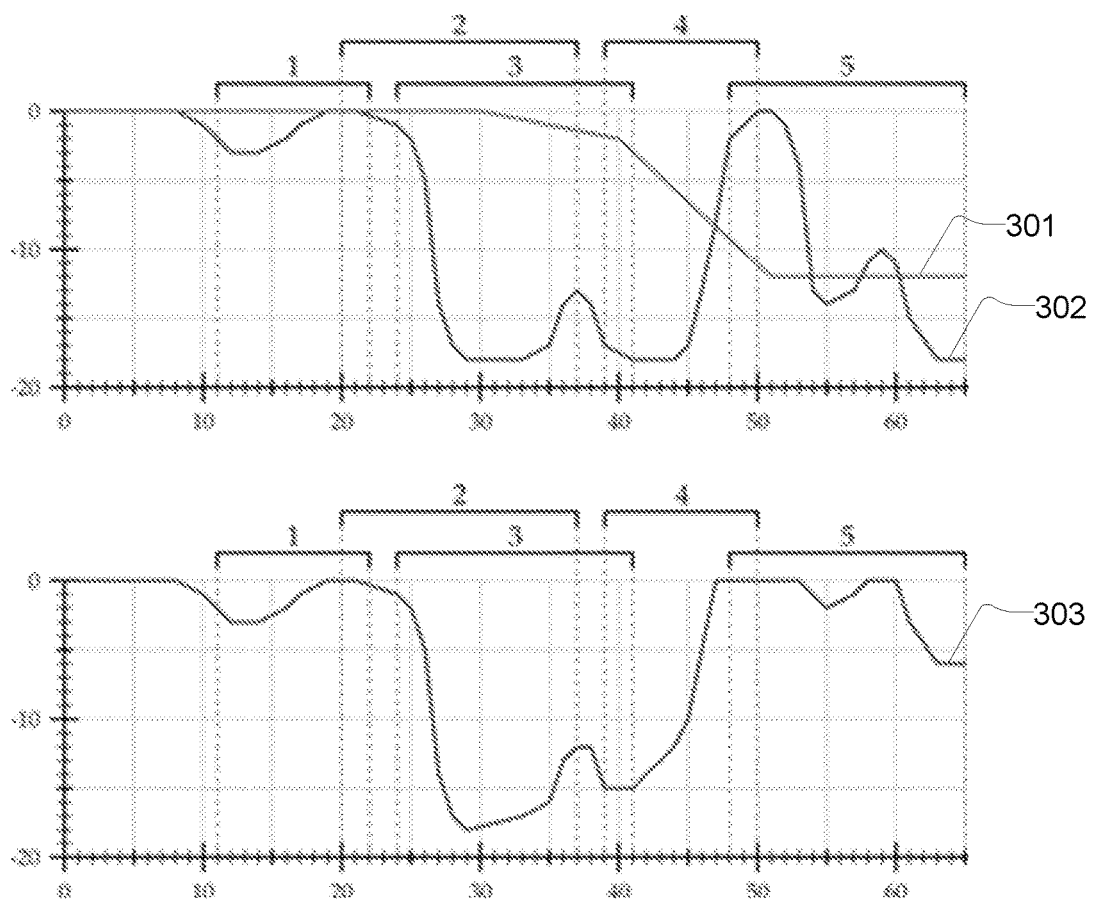
FIGS. 3 through 7 illustrates the operation of a side-tone filter controller during configuration of side-tone filter stages.

FIG. 3, uppermost diagram, shows a noise estimate 302 for the microphone signal and a frequency domain gain estimate 301 (approximated) of a frequency domain gain transfer function for the high-shelf filter 206. The high-shelf filter may be configured (also denoted fitted) by a predefined mid-shelf frequency and a shelf gain which is based on an average noise level of the microphone signal at or above the mid-shelf frequency.

The lowermost diagram shows an updated noise estimate 303 (approximated) following an approximated filtering by the high-shelf filter 206.

The approximated filtering can be performed, by subtraction operations on gain values in decibels from the gain estimate 301 for the high-shelf filter 206 and noise levels or signal-to-noise ratios in decibels from the noise estimate. The approximated filtering deviates from a corresponding 'real' or more accurate simulated filtering, but is much faster to compute. Thereby, the side-tone filter can be adapted to a present noise situation much faster.

Figure 4:
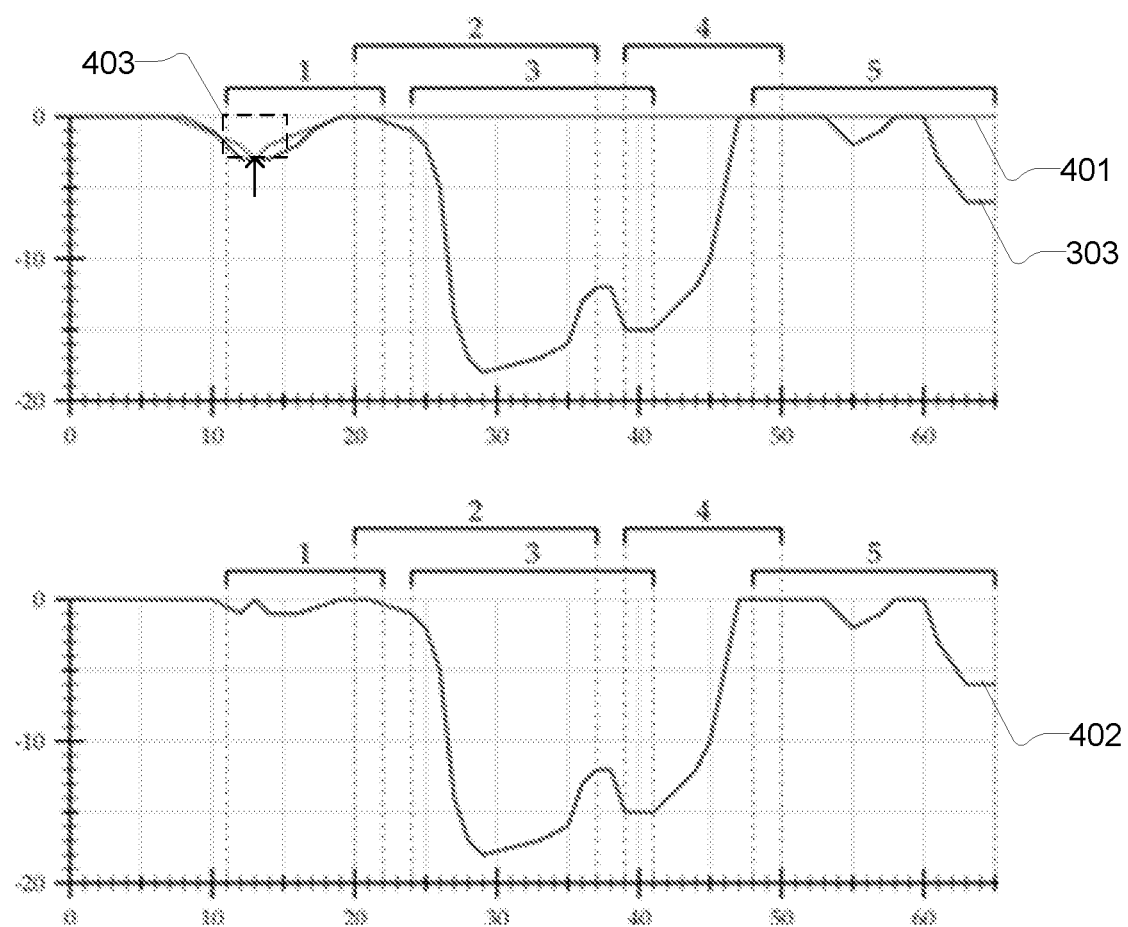

FIG. 4, uppermost diagram, shows the noise estimate 303 for the microphone signal following approximated filtering by a high-shelf filter as depicted in connection with FIG. 3 and a frequency domain gain estimate 401 (approximated) of a frequency domain gain transfer function for the peak filter 202.

The peak filter 202 may be fitted by a filter fitting process of: over a range of frequencies, iteratively selecting a frequency and for each frequency:
 determining a gain-bandwidth product of a band centred at the frequency and determining a gain factor thereof based on the signal-to-noise ratio and determining a bandwidth factor thereof as the bandwidth wherein the signal-to-noise ratio is not better than approximately half the signal-to-noise ratio at the frequency; and
 when the range of frequencies has been iterated, selecting a favourable gain-bandwidth product, such as the largest gain-bandwidth product, which is illustrated by the dashed-line box 403, and estimating parameters for the peak-filter, with a centre frequency (at the centre of the dashed-line box 403) and a gain (corresponding to the height of the dashed-line box 403) to approximately fit the determined band.

The filter fitting process results in an approximated frequency domain gain estimate 401 (approximated) of a frequency domain gain transfer function for the peak filter 202.

In some embodiments the range of frequencies which the iterations run over, are limited by different bands e.g. limited by the band designated "1" for fitting the peak filter 202. The other peak filters may be fitted using a limited range of frequencies which the iterations run over such as indicated by the bands designated "2", "3", "4", and "5". In some embodiments the bands have overlapping frequencies.

The lowermost diagram shows an updated noise estimate 402 (approximated) following an approximated filtering by the peak filter 202. The approximated filtering can be performed by subtraction operations as mentioned above.

Figure 5:
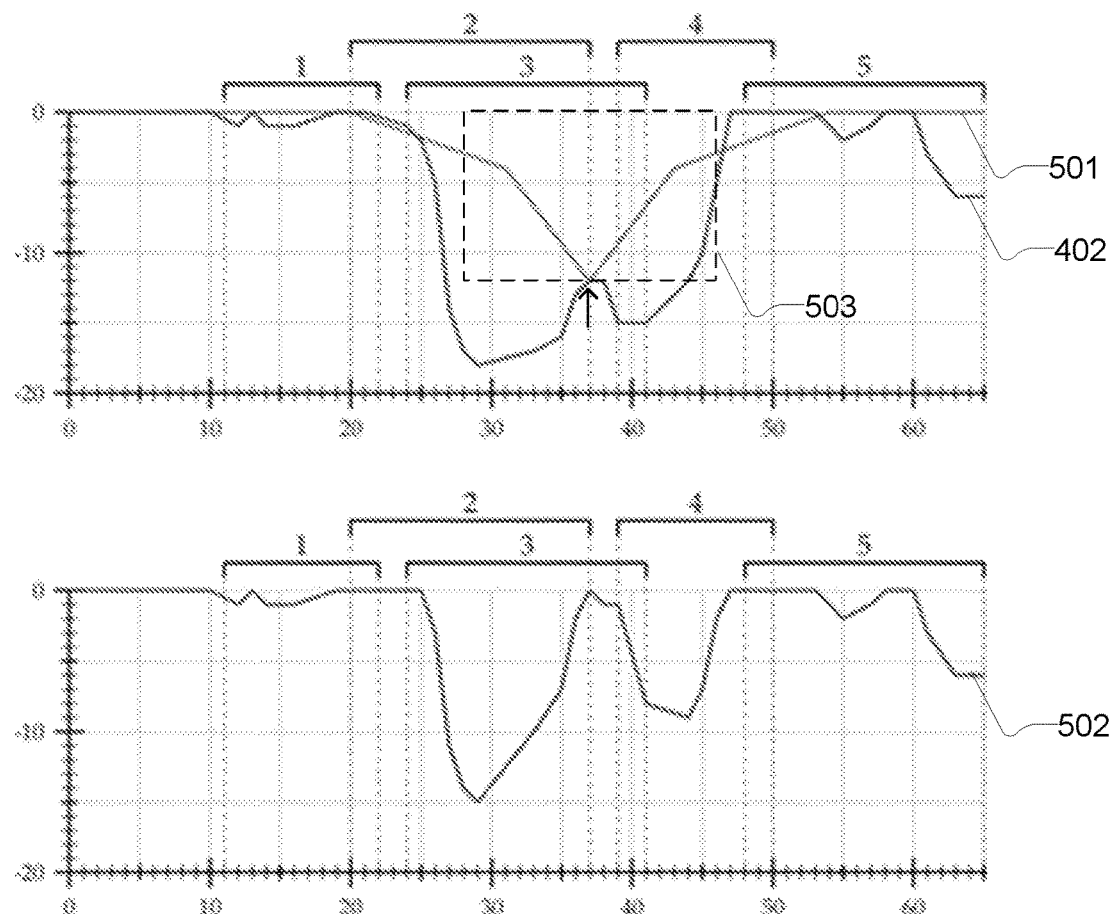

FIG. 5, uppermost diagram, shows the noise estimate 402 for the microphone signal following approximated filtering by the high-shelf filter and peak filter as depicted in connection with FIGS. 3 and 4, and a frequency domain gain estimate 501 (approximated) of a frequency domain gain transfer function for the peak filter 203. The peak filter 203 may be fitted by the filter fitting process described above.

As described above, in connection with the filter fitting process a favourable gain-bandwidth product, such as the largest gain-bandwidth product, is illustrated by the dashed-line box 503; a centre frequency is located at the centre of the dashed-line box 503 and a gain corresponds to the height of the dashed-line box 503. This may serve as a representation of an approximate filter fit.

The lowermost diagram shows an updated noise estimate 502 (approximated) following approximated filtering by the high-shelf filter 206, the peak filter 202 and the peak filter 203.

Figure 6:
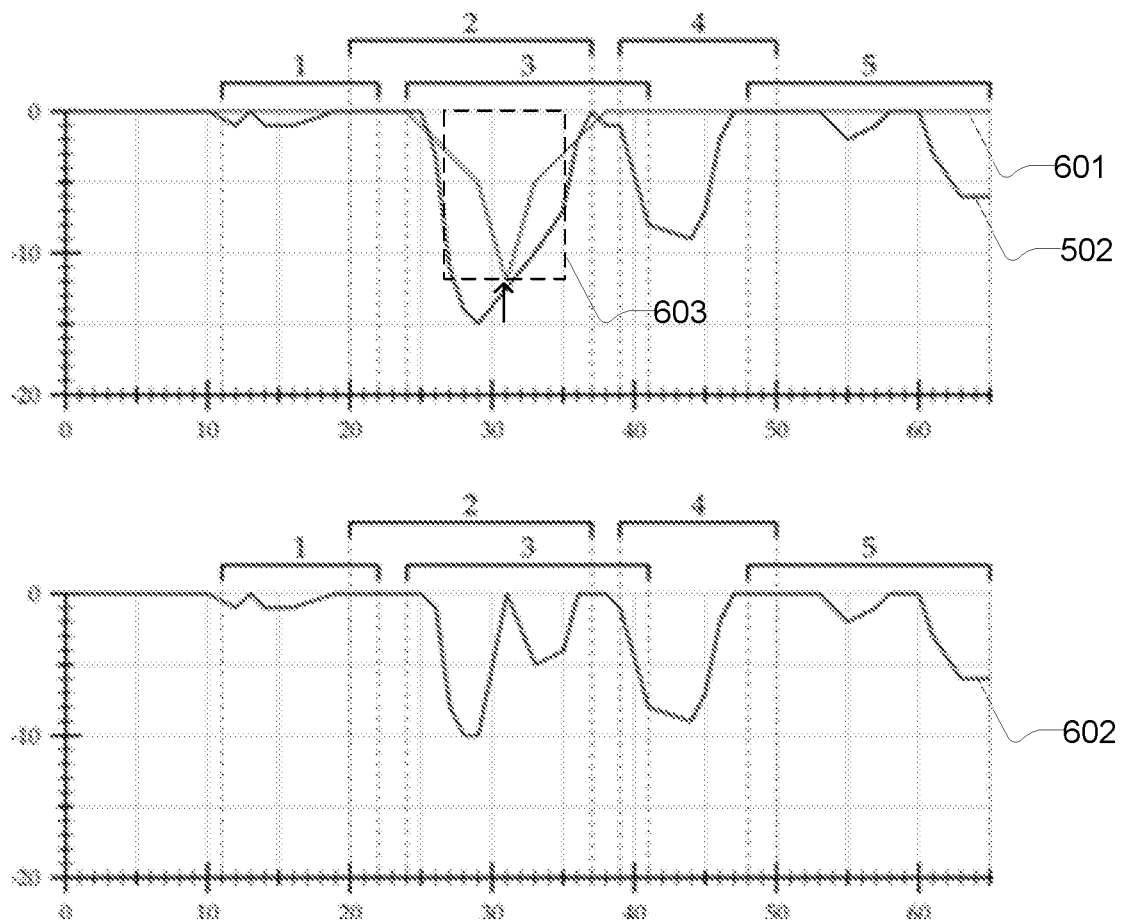

FIG. 6 shows in a similar manner as described above, the noise estimate 502 following approximated filtering by the high-shelf filter 206, the peak filter 202 and the peak filter 203 and a frequency domain gain estimate 601 (approximated) of a frequency domain gain transfer function for the peak filter 204. A favourable gain-bandwidth product, such as the largest gain-bandwidth product, is illustrated by the dashed-line box 603; a centre frequency is located at the centre of the dashed-line box 603 and a gain corresponds to the height of the dashed-line box 603.

A resulting updated noise estimate 602 is shown lowermost.

Figure 7:
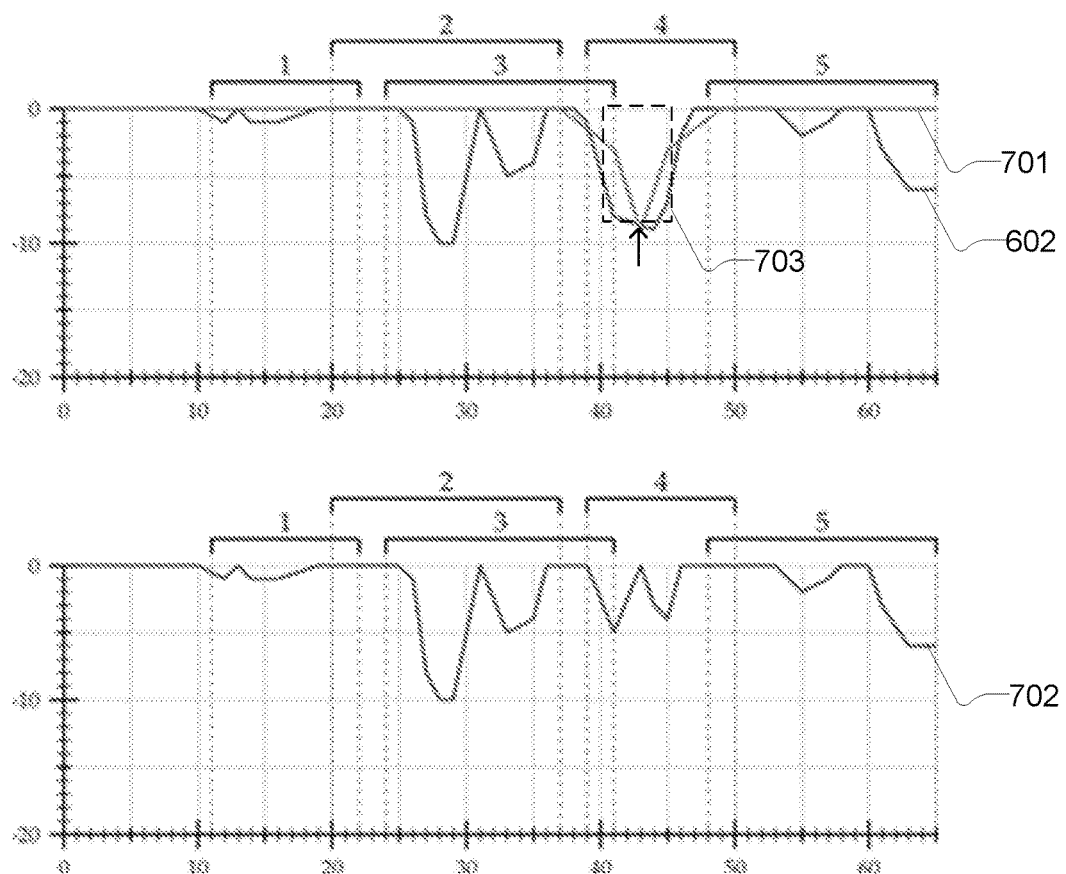

FIG. 7 shows in a similar manner as described above, the noise estimate 602 following approximated filtering by the high-shelf filter 206, the peak filter 202, the peak filter 203 and the peak filter 204 and a frequency domain gain estimate 701 (approximated) of a frequency domain gain transfer function for the peak filter 205. A favourable gain-bandwidth product, such as the largest gain-bandwidth product, is illustrated by the dashed-line box 703; a centre frequency is located at the centre of the dashed-line box 603 and a gain corresponds to the height of the dashed-line box 703.

A resulting updated noise estimate 702 is shown lowermost.

Albeit in an approximated way, the resulting updated noise estimate 702 compared to the estimated noise estimate 302 is indicative of the noise suppression achieved by the controllable side-tone filter. When the side-tone filter stages are configured with coefficients, computed from the parameters estimated as illustrated above, it may be experienced that achieved noise suppression is better than indicated by the approximation.

Figure 8:
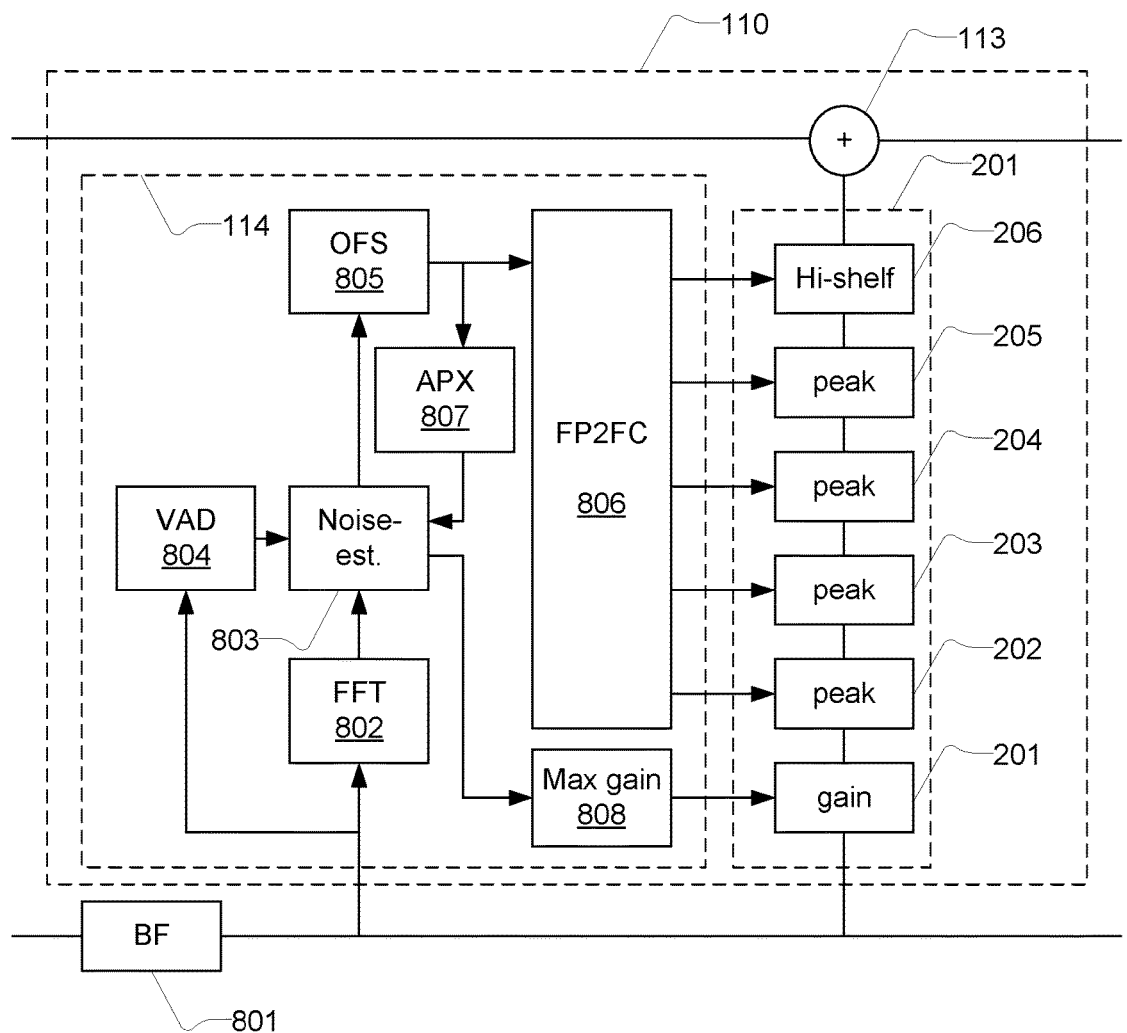
FIG. 8 shows a more detailed block diagram of a side-tone filter and a side-tone filter controller.

FIG. 8 shows a more detailed block diagram of a side-tone filter and a side-tone filter controller.

The side-tone filter controller 114 comprises an FFT component 802 that receives the microphone signal and computes an FFT frequency amplitude or power spectrum from a sampled time-domain microphone signal. Based on the FFT frequency amplitude or power spectrum a noise estimator 803 computes a noise estimate as illustrated above for the microphone signal. The noise estimator 803 may base its computation of the noise estimate on a signal, from a voice-activity-detector 804, indicative of whether speech is present in the microphone signal or not.

Based on the noise estimate an optimal filter search, OFS, component 805 performs a search for parameters for an optimal filter as described above and passes the parameters found onto a filter parameter to filter coefficients, FP2FC, component 806 which computes filter coefficients and configures the filter stages 202 through 206 accordingly. The parameters are also passed on to an approximator, APX, 807 which computes an approximated frequency domain gain response based on the filter parameters, whereby noise estimator 803 can compute an updated noise estimate.

Based on the noise estimate, a max gain component 808 computes a gain coefficient for the gain stage 201.

As shown the signal processor may comprise a beam former 801 which generates the microphone signal from two or more microphones. In some embodiments the beam former is omitted.

Figure 9:
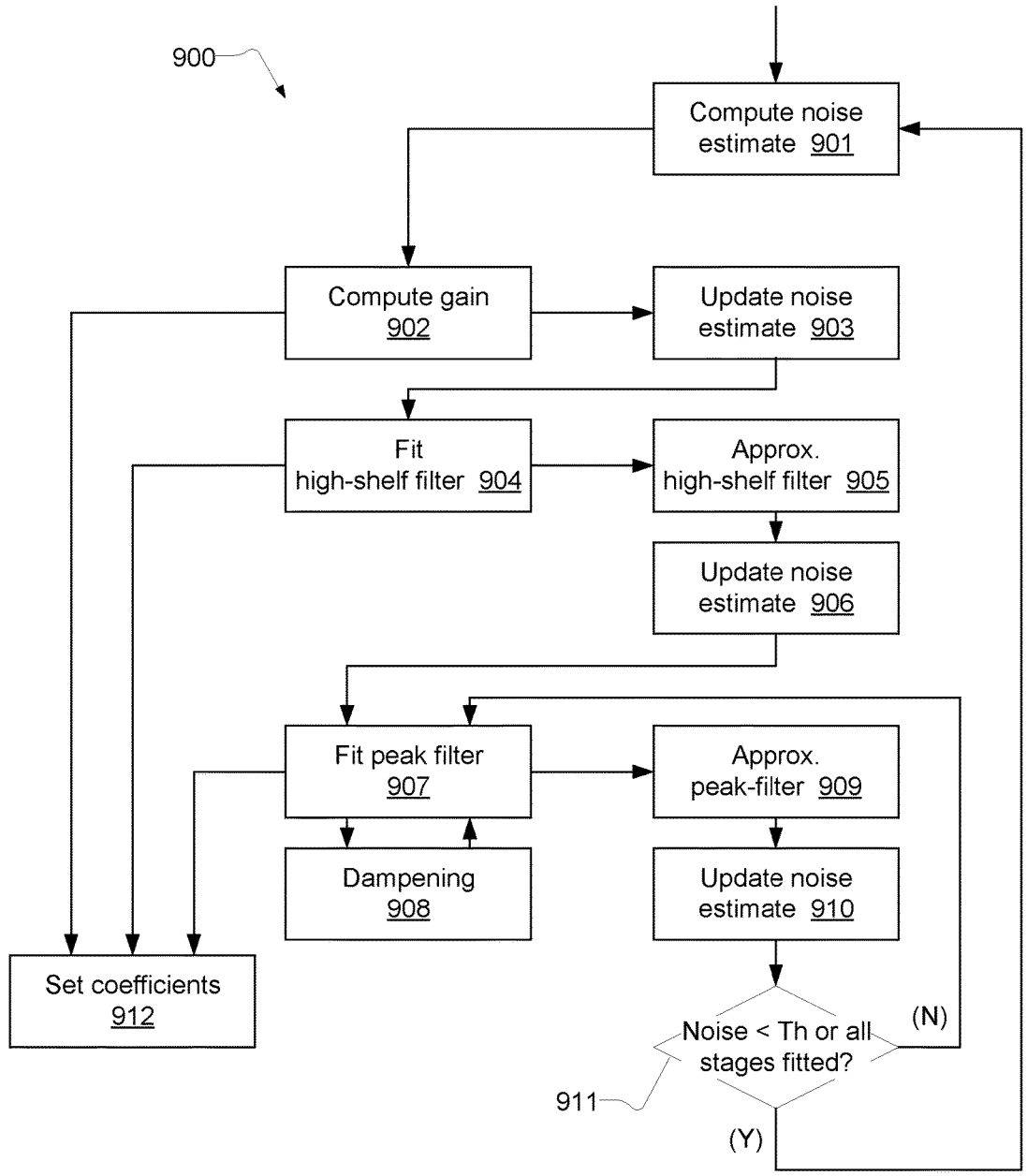
FIG. 9 shows a flowchart of controlling a side-tone filter.

FIG. 9 shows a flowchart for a process of controlling a side-tone filter. The flowchart is generally designated by reference numeral 900. The process of controlling the side-tone filter may be performed by the side-tone filter controller 114 or the signal processor 105. Controlling of the side-tone filter is performed as a repeated process which may be initiated on an interrupt or as a continuous process. Controlling starts in step 901 by computing a noise estimate based on the microphone signal. From the noise estimate an optimal gain is computed in step 902; the optimal gain is used in step 912, which sets a gain coefficient to the gain stage 201, and in step 903, which updates the noise estimate based on the computed gain. Step 912 computes filter coefficients from filter parameters.

Following step 903, a high-shelf filter is fitted in step 904, comprising determining parameters for the high-shelf filter, based on which an approximation of the high-shelf filter is computed in step 905. The noise estimate is then updated in step 906 to take into account the effect of the high-shelf filter, as described above. The parameters for the high-shelf filter computed in step 904 are also used in step 912, which sets filter coefficients for the high-shelf filter stage 206.

Following step 906, one or more peak filters are fitted in step 907 using a similar approach, wherein an approximation of a peak-filter is computed in step 909 and an updated noise estimate is computed in step 910. The parameters for the peak filter computed in step 907 are also used in step 912, which sets filter coefficients for the high-shelf filter stage 206.

Following step 910, step 911 evaluates one or more of the criteria of:
1) the noise level at one or more frequencies or frequency bins or frequency bands is below a predefined threshold; or
2) the signal-to-noise level at one or more frequencies or frequency bins or frequency bands is above a predefined threshold or
3) all filter stages have been fitted since the process started out in step 901.

In the negative event thereof (N) the process resumes at step 907 to fit a further peak filter; whereas in the positive event thereof the process resumes to step 901 or completes itself until initiated again.

The coefficients computed in step 912 may be configured into the gain or filter stages as they are computed while the process is running or immediately before the process is complete or immediately thereafter.

Step 908 is performed in connection with step 907 to low-pass filter the amount of change that a peak filter is allowed to change from one iteration to the next. Thereby non-linear distortion caused by changing (time varying) side-tone filtering may be kept at a low level, such as below an audible level.

The invention claimed is:

1. A signal processor for a headset configured with a microphone terminal for receiving a microphone signal, a loudspeaker terminal for outputting a loudspeaker signal, and a far-end terminal for communicating an inbound signal and an outbound signal with a far-end; comprising:
   an outbound path from the microphone terminal to the far-end terminal;
   a side-tone path configured to generate a side-tone signal from the microphone signal via a side-tone filter,
   an inbound path from the far-end terminal to the loudspeaker terminal and comprising a combiner configured to combine the side-tone signal and the inbound signal to generate the loudspeaker signal; and
   a side-tone filter controller that receives the microphone signal and computes a first noise estimate with a signal-to-noise level of the microphone signal at respective frequency bands and based thereon controls the side-tone filter to improve a signal-to-noise ratio of the side-tone signal;
   wherein the side-tone filter in the side-tone path comprises multiple filter stages that are individually controlled based on the first noise estimate; and
   wherein the multiple filter stages are configured from a group consisting of: multiple peak filters and a high-shelf filter;
   and wherein the side-tone filter controller executes an iterative process of:
       determining parameters for a filter stage based on the first noise estimate;
       computing a frequency domain gain estimate of the frequency domain gain transfer function for a filter stage;
       computing a second noise estimate by subtracting the frequency domain gain estimate from the first noise estimate;
       updating the first noise estimate to be in accordance with the second noise estimate;

wherein the filter stages are controlled via coefficients computed from the parameters for a respective filter stage computed over iterations of the iterative process; and wherein determining parameters for a filter stage comprises fitting a filter that has a largest possible gain-bandwidth product while optimizing the signal-to-noise ratio in an audio band of interest.

2. A signal processor according to claim 1, wherein fitting a filter comprises:
over a range of frequencies, iteratively selecting a frequency; and
determining a gain-bandwidth product of a band centred at the frequency and determining a gain factor thereof based on the signal-to-noise ratio and determining a bandwidth factor thereof as the bandwidth wherein the signal-to-noise ratio is not better than approximately half the signal-to-noise ratio at the frequency;
when the range of frequencies has been iterated, selecting a favourable gain-bandwidth product, such as the largest gain-bandwidth product, and estimating parameters for a band-attenuate filter, such as a peak-filter, with a centre frequency and a gain to approximately fit the determined band.

3. A signal processor according to claim 1, wherein fitting a filter comprises:
fitting a high-shelf filter by selecting a predetermined shelf mid-point frequency and determining a shelf gain, such as an attenuation, from an average of the signal-to-noise ratio at frequencies above the shelf mid-point frequency.

4. A signal processor according to claim 1, wherein the signal processor:
at a first time, computes a reference gain based on a minimum attenuation in the noise estimate and scales the microphone signal based on the reference gain; and
at a second time, following the first time, and iteratively selecting a frequency.

5. A signal processor according to claim 4, wherein the signal processor:
at a second time, computes a frequency domain gain estimate of a high-shelf filter, and then computes a second noise estimate by subtracting the frequency domain gain estimate from the first noise estimate;
at a third time, following the second time, and iteratively selecting a frequency, wherein the filter is a stop-band filter or a peak-filter.

6. A signal processor according to claim 1, wherein a cost function is defined for an optimization process; and
wherein the cost function is a frequency domain estimate of the signal-to-noise ratio which in a first iteration is computed from the microphone signal and in subsequent iterations is computed from the cost function and estimates in the frequency domain of selected filters; and
wherein the optimization process iteratively selects a filter with an optimization strategy to optimize the cost function and then updates the cost function.

7. A signal processor according to claim 1, wherein determining parameters for a filter stage by fitting a filter comprises dampening the rate and/or distance the centre frequency and/or bandwidth is allowed to change over time.

8. A signal processor according to claim 1, comprising a voice activity detector which indicates presence of speech;
wherein a first amplitude or power spectrum for the microphone signal is computed at a time when the voice activity detector is detecting speech;

wherein a second amplitude or power spectrum for the microphone signal is computed at a time when the voice activity detector is not detecting speech; and
wherein the signal-to-noise ratio is computed from the first amplitude or power spectrum and the second amplitude or power spectrum.

9. A headset comprising a voice microphone, an earpiece with a loudspeaker and a signal processor according to claim 1.

10. A signal processing method for generating a side-tone in a headset, comprising:
generating a side-tone signal via a side-tone filter and from a microphone signal picked up via a microphone of the headset,
combining the side-tone signal and an inbound signal to the headset to generate a loudspeaker signal for a loudspeaker of the headset;
computing a first noise estimate of the microphone signal at respective frequency bands and based thereon controlling the side-tone filter to improve a signal-to-noise ratio of the side-tone signal;
wherein the side-tone filter comprises multiple filter stages that are individually controlled based on the first noise estimate; and
wherein the multiple filter stages are configured from a group consisting of: multiple peak filters and a high-shelf filter.

11. A computer-readable medium carrying a program configured to perform the method as claimed in claim 10, wherein the method is a computer-implemented method run on a computer.

12. A signal processor for a headset configured with a microphone terminal for receiving a microphone signal, a loudspeaker terminal for outputting a loudspeaker signal, and a far-end terminal for communicating an inbound signal and an outbound signal with a far-end; comprising:
an outbound path from the microphone terminal to the far-end terminal;
a side-tone path configured to generate a side-tone signal from the microphone signal via a side-tone filter,
an inbound path from the far-end terminal to the loudspeaker terminal and comprising a combiner configured to combine the side-tone signal and the inbound signal to generate the loudspeaker signal; and
a side-tone filter controller that receives the microphone signal and computes a first noise estimate with a signal-to-noise level of the microphone signal at respective frequency bands and based thereon controls the side-tone filter to improve a signal-to-noise ratio of the side-tone signal;
wherein the side-tone filter in the side-tone path comprises multiple filter stages that are individually controlled based on the first noise estimate; and
wherein the multiple filter stages are configured from a group consisting of: multiple peak filters and a high-shelf filter.

13. A signal processor according to claim 12 wherein fitting a filter comprises:
over a range of frequencies, iteratively selecting a frequency; and
determining a gain-bandwidth product of a band centered at the frequency and determining a gain factor thereof based on the signal-to-noise ratio and determining a bandwidth factor thereof as the bandwidth wherein the signal-to-noise ratio is not better than approximately half the signal-to-noise ratio at the frequency;

when the range of frequencies has been iterated, selecting a favorable gain-bandwidth product, such as the largest gain-bandwidth product, and estimating parameters for a band-attenuate filter, such as a peak-filter, with a center frequency and a gain to approximately fit the determined band.

14. A signal processor according to claim 13 wherein fitting a filter comprises:
fitting a high-shelf filter by selecting a predetermined shelf mid-point frequency and determining a shelf gain, such as an attenuation, from an average of the signal-to-noise ratio at frequencies above the shelf mid-point frequency.

15. A signal processor according to claim 13, wherein the signal processor:
at a first time, computes a reference gain based on a minimum attenuation in the noise estimate and scales the microphone signal based on the reference gain; and
at a second time, following the first time, and iteratively selecting a frequency.

16. A signal processor according to claim 15, wherein the signal processor:
at a second time, computes a frequency domain gain estimate of a high-shelf filter, and then computes a second noise estimate by subtracting the frequency domain gain estimate from the first noise estimate;
at a third time, following the second time, and iteratively selecting a frequency, wherein the filter is a stop-band filter or a peak-filter.

17. A signal processor according to claim 13, wherein determining parameters for a filter stage by fitting a filter comprises dampening the rate and/or distance the center frequency and/or bandwidth is allowed to change over time.

18. A signal processor according to claim 13, comprising a voice activity detector which indicates presence of speech;
wherein a first amplitude or power spectrum for the microphone signal is computed at a time when the voice activity detector is detecting speech;
wherein a second amplitude or power spectrum for the microphone signal is computed at a time when the voice activity detector is not detecting speech; and
wherein the signal-to-noise ratio is computed from the first amplitude or power spectrum and the second amplitude or power spectrum.

19. A signal processor according to claim 12, wherein a cost function is defined for an optimization process; and
wherein the cost function is a frequency domain estimate of the signal-to-noise ratio which in a first iteration is computed from the microphone signal and in subsequent iterations is computed from the cost function and estimates in the frequency domain of selected filters; and
wherein the optimization process iteratively selects a filter with an optimization strategy to optimize the cost function and then updates the cost function.

* * * * *